Aug. 3, 1926.
D. T. ROBINSON
1,594,563
LAUNDRY CALENDAR
Filed Sept. 30, 1924
Fig. 1.
Fig. 2.
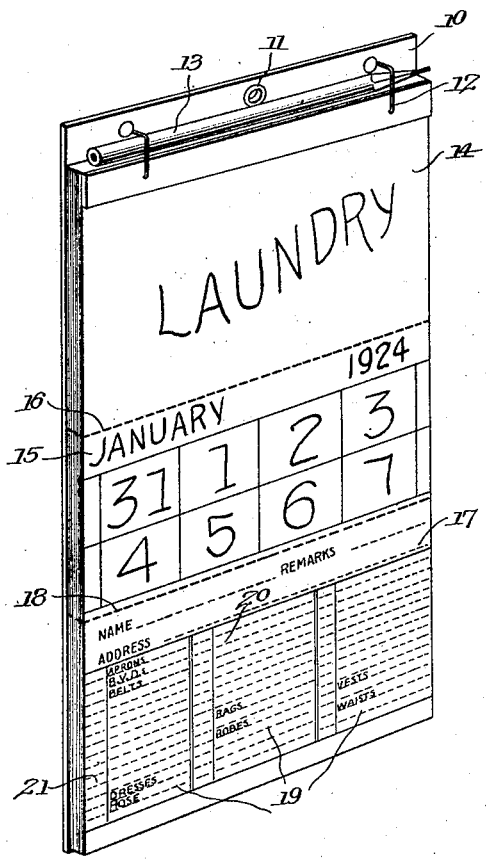
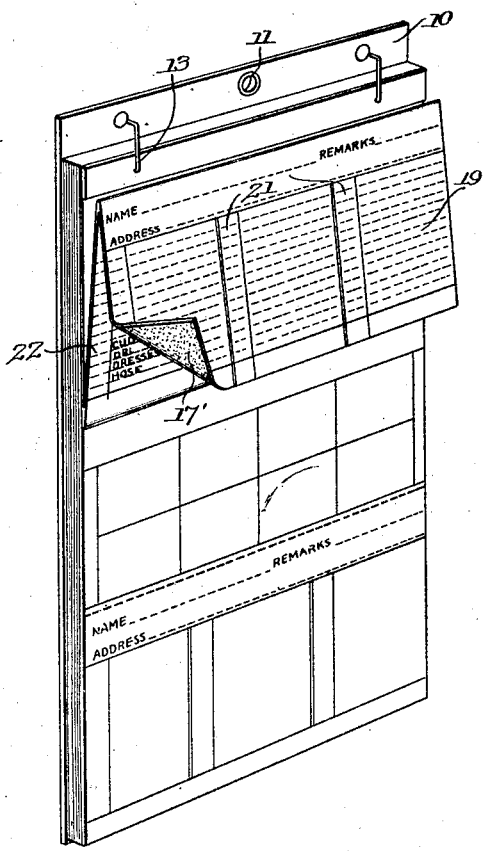
Inventor
Donald T. Robinson
Attorneys Patented Aug. 3, 1926.

1,594,563

UNITED STATES PATENT OFFICE.

DONALD T. ROBINSON, OF PENDLETON, OREGON.

LAUNDRY CALENDAR.

Application filed September 30, 1924. Serial No. 740,765.

The present invention relates to printed records and more particularly to a device for listing and recording articles of apparel and the like when forwarded to a laundry or other concern for work thereon and subsequently to be returned.

An object of the invention is to provide a calendar consisting of a plurality or series of sheets each having noted thereon a number of consecutive dates, and each sheet having associated therewith a list blank which may be filled out and readily detached from the calendar sheet to forward with the articles to the laundry.

The list sheet is preferably connected detachably to one end of the calendar sheet, and associated with these sheets, preferably on the back of the calendar sheet, is a duplicate list, the two sheets being adapted to be superposed so that a duplicate list may be made and retained by the person forwarding the articles. Moreover, the invention contemplates the provision of a transfer medium in conjunction with one of these sheets, and for this purpose the back of the list sheet is preferably treated with some medium such as carbon.

Referring to the accompanying drawings, wherein there is shown one embodiment of the invention:

Figure 1 is a perspective view, and

Figure 2 is a view similar to Figure 1, indicating the manner in which a page is folded when a list sheet is filled out.

In the drawings, 10 indicates a backing for a number of pages, the backing having an opening or eyelet 11 by means of which the device may be suitably suspended and the pages are secured thereto by means of any suitable fastener, such as lengths of wire 12, shaped to provide holding sockets for a pencil or other marking instrumentality 13.

Each page of the device comprises a heading 14, upon which may appear any suitable advertising matter, the heading serving to carry a calendar sheet 15 having a number of successive dates marked thereon, and detachably connected to the heading along the perforated line 16. To a portion of the calendar sheet 15, preferably the lower edge, is connected an article list sheet 17, along a perforated line 18. The list may be arranged on the sheet 17 in any desirable manner. As indicated in the drawings, there are a number of heading lines for the name and address of the owner of the articles, and a series of vertical columns 19, divided by horizontal lines bearing the names of the articles. Each column is divided by a vertical line 20 to provide a number column 21 in which column may be checked the numbers of each article forwarded.

I am aware that it is broadly old to provide in association with a calendar sheet a list for laundry and the like, but it is not old to make such a list detachable from the calendar sheet, and, further, to associate with the calendar sheet a duplicate list which is an essential feature of my invention. This list blank 22 is located on the back of the calendar sheet 15 so that the two sheets 15 and 17 may be superposed as indicated in Figure 2. Moreover, I prefer to provide in conjunction with one of the sheets a transfer medium so that the duplicate list 22 may be filled out at the same time as the forwarding list sheet 17. For this purpose the back 17′ of the sheet 17 may be treated with carbon, and when the two sheets are superposed as indicated in Figure 2, the characters printed on the sheet 17 will be transferred to the list 22.

When using the calendar, the articles forwarded to a laundry on any of the dates appearing on one of the calendar sheets, are listed on the blank list sheet attached to the particular calendar sheet and the date of forwarding is checked on the calendar sheet. When filling out a list, the calendar sheet 15 is folded upwardly along the dotted line 16 and the sheet 17 is folded over the back of the calendar sheet to superpose the two list blanks. This is shown clearly in Figure 2. After the articles have been completely itemized by the housekeeper or customer, the list sheet 17 may be separated from the calendar sheet 15 and forwarded with the articles to the laundry. When the laundry is returned, which is ordinarily within the period covered by the calendar sheet, the articles may be checked up with the duplicate list which has been retained. Thereafter, the calendar sheet and duplicate list may be discarded by severing the same from the heading 14 along the dotted line 16. It will be, of course, understood that the forwarding of a list with the articles to the laundry enables the laundry to check up the housekeepers list with its own counting, and immediately to advise if there is any discrepancy at the time the articles are received.

Preferably, each of the sheets 15 is provided with a calendar arranged so that the first date appearing thereon will correspond to the day that the laundry is usually collected, and the last date on the sheet will indicate the day the laundry is returned. Thus, it will be seen that the duplicate article list on the back of the calendar and the sheet 15 may be removed at the same time. Furthermore, the housewife, by referring to the calendar, will be able to have the laundry ready for the collector on the days he is scheduled to call for the same.

Obviously, the invention is not limited to the precise details illustrated and described but is defined by the following claims.

I claim:

1. A calendar of the class described, comprising a series of sheets each having a main body portion and a portion detachable therefrom, said detachable portion having an article list thereon, a duplicate article list on the body portion positioned to register with the article list when the sheet is folded to superpose said portions, each of the sheets being calendared for a relatively short period whereby it may serve as a calendar for a period of time substantially corresponding to the period for which the duplicate article list thereon is needed, and a transfer medium associated with said portions.

2. A calendar of the class described comprising a series of calendar sheets each having a main body portion and a portion detachable therefrom, said detachable portion having an article list thereon, a duplicate article list on the back of the body portion adapted to register with the article list when the sheet is folded to superpose said portion, each of said sheets being periodically calendared whereby it may serve as a calendar for a period of time substantially corresponding to the period for which the duplicate article list is needed, and a transfer medium carried by said detachable portion.

3. A sheet of the class described, comprising a calendar portion and a list portion on the same face, a second list portion on the opposite face of the sheet and positioned to register with said first mentioned list portion when the sheet is folded to superpose said portions, and a transfer medium associated with one of said portions.

4. A sheet of the class described, comprising a calendar portion and a list portion on the same face, a detachable list portion on the opposite face of the sheet and positioned to register with said first mentioned list portion when said portions are superposed, and a transfer medium associated with one of said portions.

5. A calendar of the class described, comprising a series of sheets each having a main body portion and a portion detachable therefrom, said detachable portion having an article list thereon, a duplicate article list on the body portion positioned to register with the article list when the sheet is folded to superpose said portions, each of the sheets being calendared for a relatively short period whereby it may serve as a calendar for a period of time substantially corresponding to the period for which the duplicate article list thereon is needed, the duplicate article portion and calendar portion being on opposite faces, and a transfer medium associated with said portions.

6. A calendar of the class described comprising a series of sheets each having a main body portion and a portion detachable therefrom, said body portion being calendared to indicate a relatively short period of time thereon, said detachable portion provided with an article list, a duplicate article list on said main body portion positioned to register with the first mentioned article list when the sheet is folded to superpose said portions, the duplicate article portion and calendar portion being on opposite faces, the calendared portion adapted to serve as a calendar for a period of time substantially corresponding to the period for which the duplicate article list is needed, and a transfer medium carried by said detachable portion.

In testimony whereof I have hereunto set my hand.

DONALD T. ROBINSON.